United States Patent [19]

Schaefer

[11] Patent Number: 4,923,732

[45] Date of Patent: May 8, 1990

[54] LEATHER, IN PARTICULAR SPLIT LEATHER PROVIDED WITH A DRESSING AS A PROCESS AND APPARATUS FOR PRODUCING DRESSED LEATHER

[75] Inventor: Philipp Schaefer, Oberstrasse 16, D-3000 Hannover, Fed. Rep. of Germany

[73] Assignees: Philipp Schaefer, Hanover, Fed. Rep. of Germany; Microplastic Corp., Bella Vista, Panama

[21] Appl. No.: 394,239

[22] Filed: Aug. 14, 1989

Related U.S. Application Data

[60] Continuation of Ser. No. 90,956, Aug. 28, 1987, abandoned, which is a division of Ser. No. 784,866, Oct. 4, 1985, abandoned.

[30] Foreign Application Priority Data

Oct. 6, 1984 [DE] Fed. Rep. of Germany ....... 3436751

[51] Int. Cl.[5] .............................................. B32B 27/12

[52] U.S. Cl. ................................ 428/151; 428/308.4; 428/323; 428/332; 428/337; 428/423.1; 428/424.2; 428/424.6; 428/521; 428/540; 428/904

[58] Field of Search ................. 428/15, 151, 904, 323, 428/332, 540, 423.1, 423.4, 424.2, 521, 522, 310, 315, 316, 308.4, 337, 424.6

[56] References Cited

U.S. PATENT DOCUMENTS

| | | | |
|---|---|---|---|
| 4,330,597 | 5/1982 | Heins et al. | 428/473 |
| 4,581,261 | 4/1986 | Schaefer et al. | 428/151 |

*Primary Examiner*—Lorraine T. Kendell
*Attorney, Agent, or Firm*—Herbert Dubno; Andrew Wilford

[57] ABSTRACT

A dressed leather is provided at least on one side with depressions and have on this side absorbent protruding fibers. At this side the leather is bonded with a layer formed of an aqueous dispersion of synthetic plastics material, said layer fills the depressions and completely receives the protruding fibers and forms at least a part of the dressing, which dressing is provided with a structured surface at the side turned away from the leather.

Preferably, the dressing consists of two layers, the inner layer, which is adjacent the leather and completely receives the protruding fibers, is formed of the aqueous dispersion of synthetic plastics material and the outer layer, which has the structured surface, consists of an aqueous dispersion of synthetic plastics material or of a liquid solution of synthetic plastics material.

12 Claims, 7 Drawing Sheets

LEATHER, IN PARTICULAR SPLIT LEATHER PROVIDED WITH A DRESSING AS A PROCESS AND APPARATUS FOR PRODUCING DRESSED LEATHER

This is a continuation of copending patent application 07/090,956 filed Aug. 28, 1987 (now abandoned) and which is a division of application 07/784,866 filed Oct. 4, 1985 (now abandoned and refiled Jun. 9, 1988 as file-wrapper continuation 07/206,945 in turn abandoned and refiled Oct. 28, 1988 as continuation-in-part 07/264,466).

FIELD OF THE INVENTION

The invention refers to a leather, in particular a split leather, being provided at at least one side with depressions and having at least one side absorbent protruding fibers and being provided on this side with a dressing. The term "leather" is understood to comprise also materials containing leather fibers.

The invention further refers to a process for dressing such a leather, in particular split leather, as well as to an apparatus for producing dressed leather, in particular split leather.

BACKGROUND OF THE INVENTION

It is already known to provide split leather with a dressing having a structured surface, for example a surface structured like leather grain. In this case, a liquid and wet compound forming the dressing is directly applied to the top surface of the split leather, for example by pouring, spreading, rolling, spraying or printing, or by a roller coating machine, and then solidified by drying. For giving the dressing the structured surface of leather grain, the dressed split leather must be embossed after the liquid dressing compound has been dried or, after having solidified. Such embossing of the split leather is effected in an embossing press under the action of heat and of a very high pressure. The structure of the split leather and of the dressing is thereby changed in an undesired manner. The thickness of the dressed split leather is not only reduced but the hardness and stiffness of the split leather is also increased. Furthermore, the vapor permeability if any, of the dressing is reduced or destroyed, because during the embossing operation the pores existing within the dressing are again closed or destroyed, respectively, under the action of heat and pressure.

A substantial drawback of this known process resides in the fact that, for producing the dressing only thermoplastic materials deformable under the action of heat and pressure can be used, because otherwise subsequent production of the structured surface by subsequently embossing the solidified dressing would not be possible. Such thermoplastic synthetic plastics materials have, however, poorer properties than non-thermoplastic or less thermoplastic materials.

It is an additional drawback that production of the structured surface by embossing must be effected in a separate process step, which means that the dressed split leather must be further treated, i.e. must, as a rule, manually be inserted into an embossing press.

It is also known to apply the liquid dressing compound not directly onto the split leather but in several layers onto a support which is provided with an anti-adhesive coating and having a surface corresponding to the desired structure, the split leather is placed on the last layer while it is wet and subsequently the thus dressed split leather is pressed within a roll press and/or is subjected to a vacuum treatment. In this manner, an undesired rigidifying and undesired increase in hardness and an undesired reduction of the thickness of the dressed split leather is substantially avoided, but the bond strength between the dressing and the split leather is reduced.

Further, it has already been proposed to first apply part of the dressing onto a supporting base and to allow solidification of the dressing and to apply a further part of the dressing onto one side of the split leather and to place this split leather with the dressing compound applied thereon, still in a wet state onto the supporting base such that the side of the split leather being provided with the dressing rests on the solidified dressing applied to the supporting base and so that the dry side of the split leather having no dressing applied thereon shows in upward direction. The supporting base has, in this case, the negative shape of the desired surface of the dressing having the appearance of leather grain, so that on drying the dressing compound under the action of low pressure the dressing is given an appearance similar to that of leather grain. In this manner the dressing is structured such that the thickness, the softness and the steam permeability of the split leather are not or are only scarcely changed. Dressed split leathers produced in such a manner thus are soft, supple and have an appearance and properties most similar to that of full-grain leather. The substantial drawback of this known procedure resides, however, in the fact that the split leather must manually be turned upside down immediately after the wet dressing compound has been applied for full contact between with the supporting base, having a corresponding structure, and that side of the split leather which has been provided with the dressing compound and faces downwardly. In particular in connection with split leather of large area, manually turning over results in considerable difficulties and in great physical stress. Furthermore, air is included between the supporting base and the side of the split leather being provided with the dressing when manually turning over the split leather and placing same onto the supporting base, which substantially impairs the bonding strength of the dressing and the appearance of the dressing provided with the structure similar to leather grain at those areas where the air inclusions are present. This appearance is further impaired by damaging the still wet dressing when gripping the split leather for manually turning over same and by the necessity of subsequent shifting the split leather when it has not been placed on the supporting base in the correct position.

OBJECTS OF THE INVENTION

It is an object of the present invention to provide a dressed leather in which the dressing having a structured surface can be made very thin but in which an inseparable bond between the leather and the dressing is reliably provided.

It is a further object of the present invention to provide a dressed leather in which the excellent properties of natural leather, such as for example its vapor-permeability are maintained.

It is a further object of the invention to provide a dressed leather which has a nice appearance with respect to shape, noting that the surface of the dressing can be shaped such that it fully corresponds to the appearance of a natural leather. Further, a dressed leather shall be provided, in which, on tensioning, the visible surface of the dressing is not changed in an undesired manner and, above all, the dressing is not peeled off the leather.

A further object of the invention is to form the leather such that the coarse fibrous structure, in particular split leather, is not apparent on the surface of the dressing.

In addition, it is an object of the present invention to provide a process and an apparatus which can to produce a dressed leather in a simple and reliable manner. In particular, continuous production according to a conveyor-line system shall be possible.

It is a still further object of the invention to reduce as far as possible the operations becoming necessary when changing the color of the dressing.

BRIEF DESCRIPTION OF THE DRAWING

In the drawing, the invention is schematically with reference to embodiments.

SPECIFIC DESCRIPTION

Figure 1:
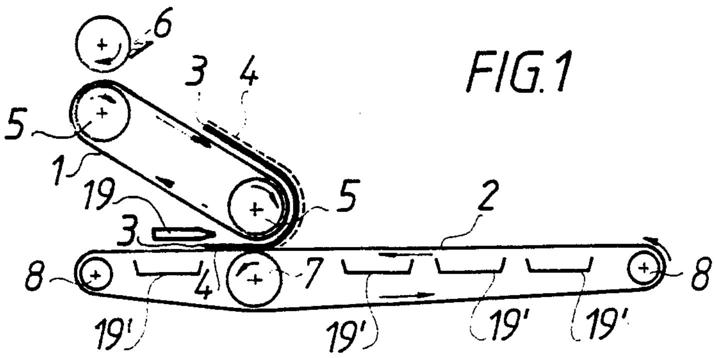
FIG. 1 shows a side elevation of a first embodiment of a part of the apparatus according to the invention.

The part, shown in FIG. 1, of the apparatus according to the invention has a supporting means 1 for the leather to be dressed, which is formed of a split leather 3. The supporting means is formed of an endless driven belt being passed over two rolls 5. The split leather 3 is placed onto the belt 1 and the dressing 4 consisting of an aqueous dispersion of synthetic plastics material is uniformly applied by means of a coating roll 6 while the split leather is passed by below the coating roll 6. The coating roll 6 rotates, as is indicated by arrows, in opposite direction to the direction of movement of the belt forming the supporting means 1.

This makes sure that, by making use of the shearing forces, the fibers protruding from the split leather 3 are completely embedded within the aqueous dispersion of synthetic plastics material applied in a single operating step and are thus inseparably bonded to this layer after solidification of this aqueous dispersion of synthetic plastics material.

In place of the coating roll 6 rotating in opposite sense, also a pouring device can be used, via which the dressing 4 consisting of an aqueous dispersion of synthetic plastics material is applied onto the split leather 3 while this is moving along. In this case, the supporting means 1 does not consist of an endless driven belt but of endless ropes passed over said both rolls 5, which provides the possibility that any excess of the aqueous dispersion of synthetic plastics material can flow off.

There is conveniently used a liquid solution of a synthetic plastics material or an aqueous dispersion of synthetic plastics material containing more than 40 percent by volume of solid matter. It is of advantage if there is used a cross linking dispersion of polyurethane and/or polybutadiene which is substantially not thermoplastic.

The lower roll 5 forms a deflection area for the belt 1, at which the split leather provided with the liquid dressing is lifted off the belt 1 and is placed on a supporting base 2 formed of a conveyor belt such that that side of the split leather 3 rests on this conveyor belt 2 which has been provided with the liquid dressing 4. The conveyor belt 2 is moved with the same speed as the belt 1 so that upon transferring the split leather 3 provided with the dressing onto the conveyor belt 2 no relative shifting movement between the split leather 3 and the conveyor belt 2 takes place.

A counter roll 7 supporting the conveyor belt 2 is provided below the lower roll 5 for preventing sagging of the conveyor belt 2 within the transfer area. This conveyor belt 2 is passed over rolls 8.

Peeling of the split leather 3 provided with the dressing 4 from the conveyor belt 1 and transfer of this split leather onto the conveyor belt 2 can be facilitated if a pressurized air nozzle 19 is arranged at the transfer area and the pressurized air flowing out of this nozzle is flowing against the split leather 3 and loosens it from the belt 1.

The conveyor belt 2 preferably consists of silicone rubber, noting that the top surface of the conveyor belt 2 has a negative grain structure, so that the dressing solidifying on the conveyor belt 2 is provided with a grain structure and thus has an appearance similar to that of leather. For accelerating film formation of the dressing, the conveyor belt 2 is heated by heating means, for example by infrared radiators 19'. Heating can, however, also be effected, for example, by means of a gas-fired radiator. Such heating reliably provides for a more rapid removal of the water or solvent, respectively.

Figure 2:
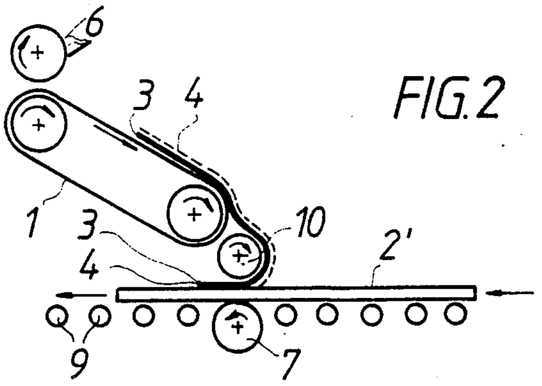
FIG. 2 shows a side elevation of a second embodiment of a part of the apparatus according to the invention.

The embodiment according to FIG. 2 differs from the embodiment according to FIG. 1 by the fact that, in place of the conveyor belt 2, a supporting base 2' is provided which is formed of a plate-like carrier body and is moved in forward direction over transport rollers 9. The plate-like carrier body preferably consists of silicone rubber and is provided with a reinforcing insert formed of a fleece or fabric of glass fibers, asbestos fibers or carbon fibers. These materials have the advantage of a low weight and of nearly no heat expansion and of being resistent, like the silicone itself, to the existing temperatures.

The reinforcing insert can be embedded within the supporting base 2', but can also be provided at the lower side of the supporting base.

The supporting base 2′ can also be constructed of two layers, the upper layer showing the surface structure being softer and more elastic, respectively, than the lower layer.

Furthermore, a transfer roll 10 is provided at the transfer area for transferring the split leather 3 provided with the dressing 4 to the plate-like carrier body 2′. Also this plate-like carrier body 2′ is heated by heating means 19′, for example infrared radiators.

The use of a plate-like carrier body 2′ as the supporting base has the advantage that the dressed leather can, together with the carrier body 2′, be transported away for further processing as will be explained later in detail.

In place of the transfer roll 10 there can also be provided a transfer belt by means of which the orientation of the split leather can be changed during transfer onto the plate-like carrier body 2′.

The plate-like carrier body 2′ itself can have a negative leather grain structure, so that the dressing solidifying on this carrier body is given a grain structure on its surface, but it is also possible to place onto the plate-like carrier body a paper sheet coated with synthetic plastics material and having a structured surface and causing the formation of a structured surface of the dressing. Of course, a paper sheet having such a structured surface can also be placed onto the conveyor belt 2 (FIG. 1), now having no negative leather grain structure, for forming the leather grain structure of the dressing, said paper sheet consisting, for example, of an endless paper band to be drawn off a storage roll.

Figure 3:
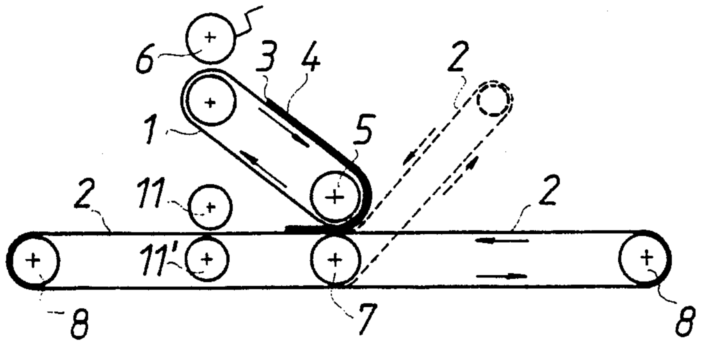
FIG. 3 shows a modified embodiment according to FIG. 1.

In the embodiment according to FIG. 3, there are provided pressing rolls or, respectively, compressing rolls 11, 11′ by means of which the split leather 3 provided with the dressing 4 being in the solidifying stage is pressed against the top surface, being provided with the grain structure, of the conveyor belt 2. From FIG. 3 can further be derived that the conveyor belt 2 need not extend within a plane over its whole length, but can be deflected for a certain angle at the area of the counter roll 7 as this is shown in FIG. 3 by dashed lines. Such an arrangement facilitates transfer of the split leather 3 provided with the dressing 4 from the belt 1 onto the conveyor belt 2.

Also in the embodiments according to the FIGS. 2 and 3 pressurized air nozzles 19 can be provided for loosening the split leather.

Figure 4:
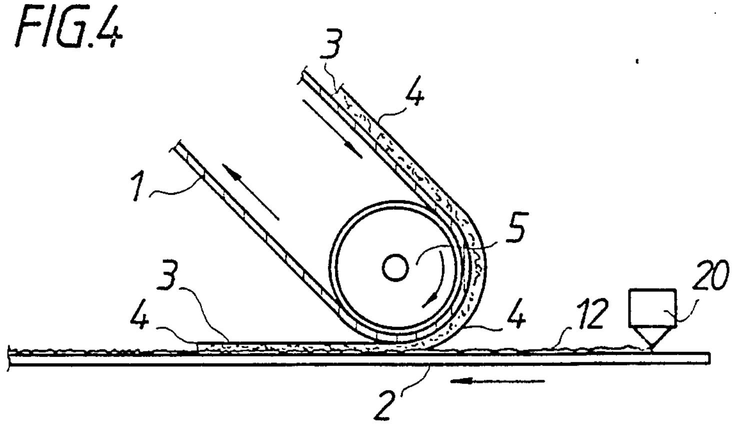
FIG. 4 shows a detail of the embodiment according to FIG. 3 in an enlarged scale.

FIG. 4 shows the application of a layer 12 onto the conveyor belt 2, which is necessary for a dressing comprising two layers. Of course, such a layer can also be applied onto a plate-like carrier body 2′ forming the supporting base or, respectively, onto the paper sheet. Forming the dressing of two layers, of which the inner layer located adjacent the split leather 3 is preferably of greater thickness than the outer layer having the structured surface, provides the advantage that the dressing has better abrasion resistance than a dressing formed of one single layer.

Application of an aqueous dispersion or liquid solution of synthetic plastics material forming the layer onto the conveyor belt 2 or, respectively, onto the carrier body 2′ is effected, for example, by pouring or spraying a thin layer by means of a suitable device 20 onto the supporting base 2 or 2′, respectively, heated to a temperatures of more than 70° C. Thereby, micropores are formed in the desired manner, because solidification of the poured or sprayed dispersion already starts on impingement onto the heated supporting base.

If the supporting base consists of a paper sheet provided with a structured surface, it is of advantage to apply the aqueous dispersion or, respectively, the liquid solution of synthetic plastics material onto the paper sheet by means of a wiper.

Conveniently, the aqueous dispersion of synthetic plastics material applied onto the supporting base by pouring or spraying and forming the outer layer has a lower viscosity and the liquid solution of synthetic plastics material applied to the supporting base by wiping has a higher viscosity than the dispersion applied onto the leather 3 and forming the inner layer 4 embedding the fibers.

Placing of the split leather 3 provided with the still wet layer 4 onto the supporting base 2 or 2′ is only affected if the layer 12 has already become solidified at least to a substantial degree. For fulfilling this condition, the application device 20 for applying the layer 12 onto the supporting base 2 or, respectively, 2′ is located at a distance from the transfer area for transferring the leather 3 from the conveyor belt 1 to the supporting base 2 or, respectively, 2′ at one side of this transfer area.

The speed of the belt 1 and of the supporting base 2 or, respectively, 2′ is conveniently infinitely variable to be in the position to adapt this speed to the existing requirements. The preferred speed for advancing the split leather 3 is between 3 and 8 m/min.

The described construction of the apparatus provides, in particular, the advantage that adhesion of the dressing compound 4 on the leather 3 is improved on account of directly or, respectively, immediately applying onto the leather 3 the dressing being in the liquid phase, so that the fiber protruding from the leather are embedded within the dressing and the dressing is inseparably bonded to the leather. On account of no manually turning over of the leather provided with the wet dressing being necessary, the finished dressing has no disturbing defects which result from grasping the leather provided with the dressing still wet or from subsequent shifting the leather having already been turned over and placed on the support. By using this apparatus, the time interval passing between application of the liquid dressing and placing the leather provided with the liquid dressing is reduced and can, above all, exactly be predetermined. Thus, the supporting base 2 or 2′, respectively, can more intensely be heated and drying of the dressing takes place within a shorter time. Furthermore, it is possible to apply the dressing compound onto the leather as a layer of smaller thickness, because of the very short time interval passing between applying the liquid dressing and turning over the leather and placing same onto the supporting base 2 or 2′, it is ensured that substantially no liquid will evaporate or migrates into the leather.

The use of the apparatus further provides the possibility to firmly and inseparably bond to the split leather 3 also porous, air-permeable and steam-permeable dressings having a density of less than 0.8 and is particularly suitable for the production of shoe uppers to be provided with a polyurethane sole by foaming same onto the upper, because the shoe upper consisting of the inventive split leather allows, when being inserted into the mold required for forming the polyurethane sole, escape of the air during foaming operation because of its porosity. Furthermore, the polyurethane sole is excellently mechanically anchored to the shoe upper during the foaming operation, because the polyurethane penetrates into the porous dressing, so that an excellent bond between the dressed split leather and the polyurethane sole is reliably obtained.

To provide for ease of cleaning of the component parts of the apparatus, all components coming into contact with the liquid solution or, the aqueous dispersion of synthetic plastics material, for example the rolls 10, 11, are provided with a coating of a silicone varnish or of silicone rubber.

Figure 7:
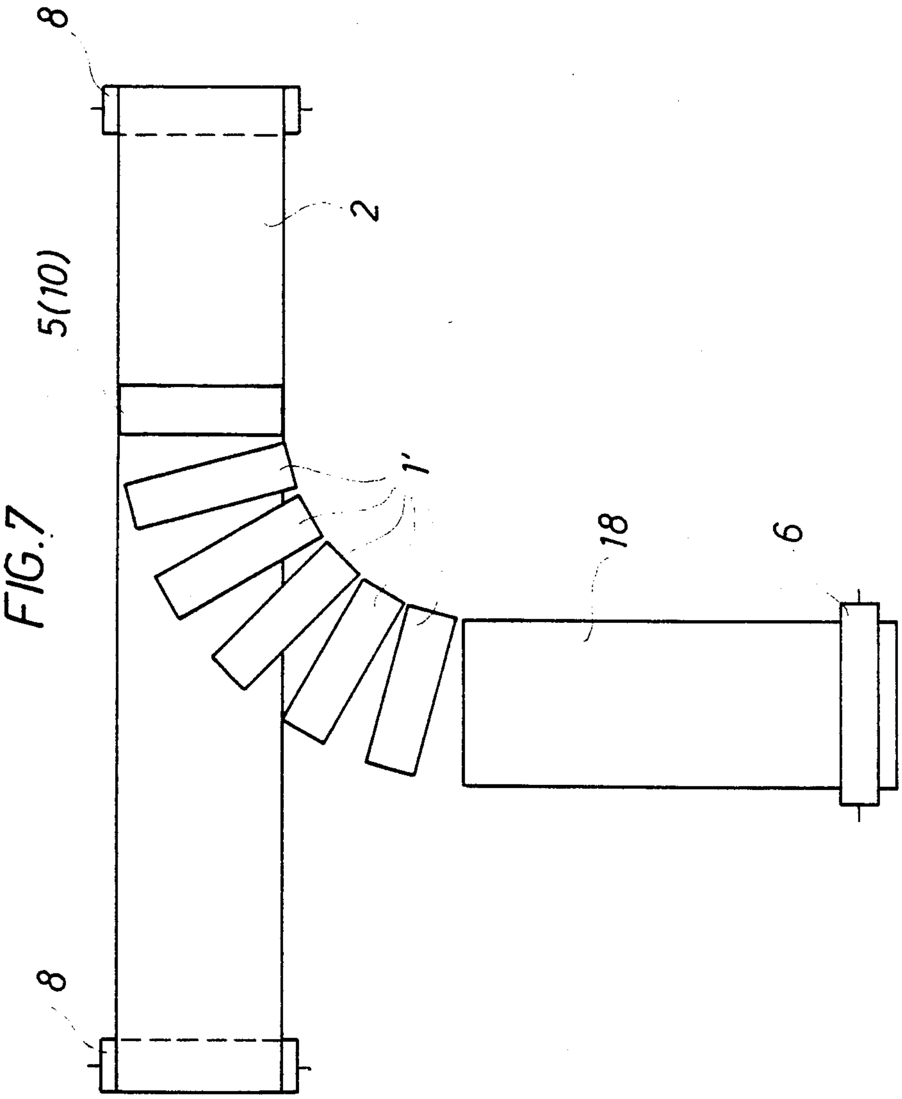
FIG. 7 shows in a top plan view a third embodiment of a part of the apparatus according to the invention.

FIG. 7 shows an apparatus according to the invention in a top plan view, according to which the supporting means consists of an arcuate deflecting device formed of a plurality of transport rolls 1'. In this apparatus there is used a known device for applying the dressing, in the liquid phase to the split leather, said device consisting of a conveyor belt 18, on which the split leather is advanced, noting that the dressing is uniformely applied onto the split leather via the application roll 6. At the end of the conveyor belt 18, which is located opposite the application roll 6, there are arranged the transport rolls 1', being at least in part driven and being arranged such that the split leather 3 is deflected for approximately 90° by these transport rolls 1' receiving the split leather from the conveyor belt 18. The last of said transport rolls 1' forms the deflection area 5, at which the split leather having applied thereon the liquid dressing 4 is placed on the supporting base formed of a conveyor belt 2 such that that side of the split leather rests on this conveyor belt 2 which has been provided with the liquid dressing 4. Of course, also in this embodiment there can be provided, in place of the conveyor belt 2, a supporting base 2' formed of a plate-like carrier body and being advanced via transport rolls in an analogous manner as in the embodiment according to FIG. 2. In any case, the deflecting device has as an effect that the transport belt 2 or, respectively, the supporting base 2' advanced via the transport rolls can be arranged at a position, in which the device for applying the dressing to the split leather forms no obstacle.

Figure 8:
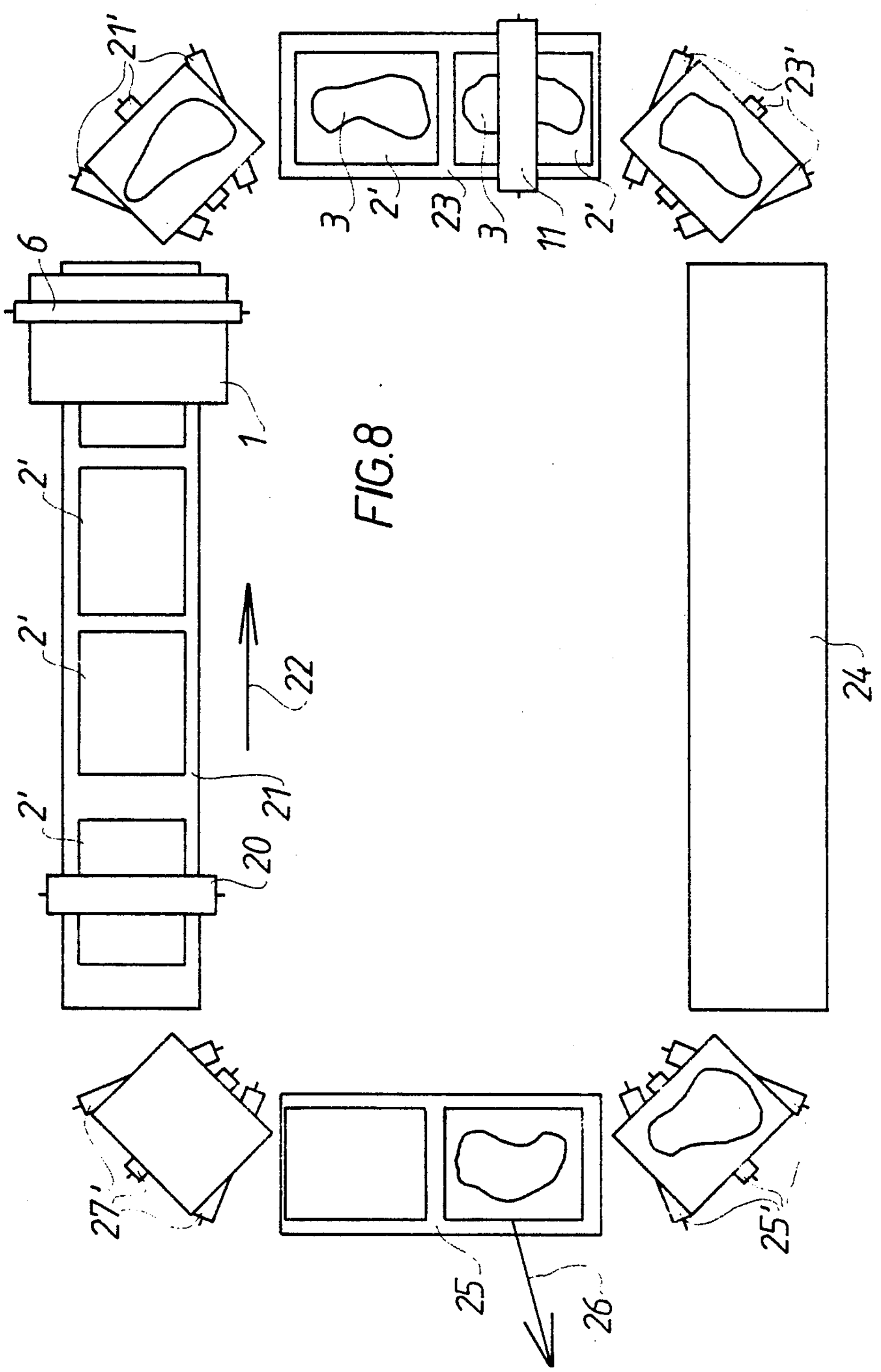
FIG. 8 schematically shows in a top plan view an inventive apparatus allowing working according to a conveyor-line process.

FIG. 8 schematically shows the continuous sequence of working steps in dressing a split leather. The supporting bases 2' of silicone rubber are advanced in direction of the arrow 22 on a conveyor belt 21 replacing the transport rolls 9 in FIG. 2. The top surface of the supporting bases 2' is a structured surface. An aqueous dispersion or a liquid solution of synthetic plastics material is poured or sprayed onto this top surface and is allowed to solidify during further advancement, solidification being accelerated by heating means (not shown) heating the supporting bases 2'.

At a distance from the device 20, there is located the transport band 1, on which the split leather 3 is resting. An aqueous dispersion of synthetic plastics material is applied onto the split leather in the described manner via the application roll 6 and subsequently the split leather is, with its wet side facing downwardly, placed upon a supporting base 2' having been provided, as explained above, with an already solidified layer.

The thus dressed split leather is deflected via transport rollers 21' and arrives on a further conveyor belt 23, where the dressed split leather is pressed against the supporting base 2' by means of press rolls 11. After a further deflection via transport rolls 23', the dressed split leather enters a vacuum device 24 to be later described in detail and moves from there via transport rolls 25' onto the conveyor belt 25 where at 26 the finished split leather 3 now provided with a dressing is removed. The supporting bases 2' are further advanced and return again onto the conveyor belt 21 via transport rolls 27'.

Figure 10:
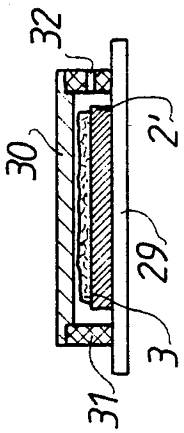
FIG. 10 shows a section along the line X—X in FIG. 9.
Figure 9:
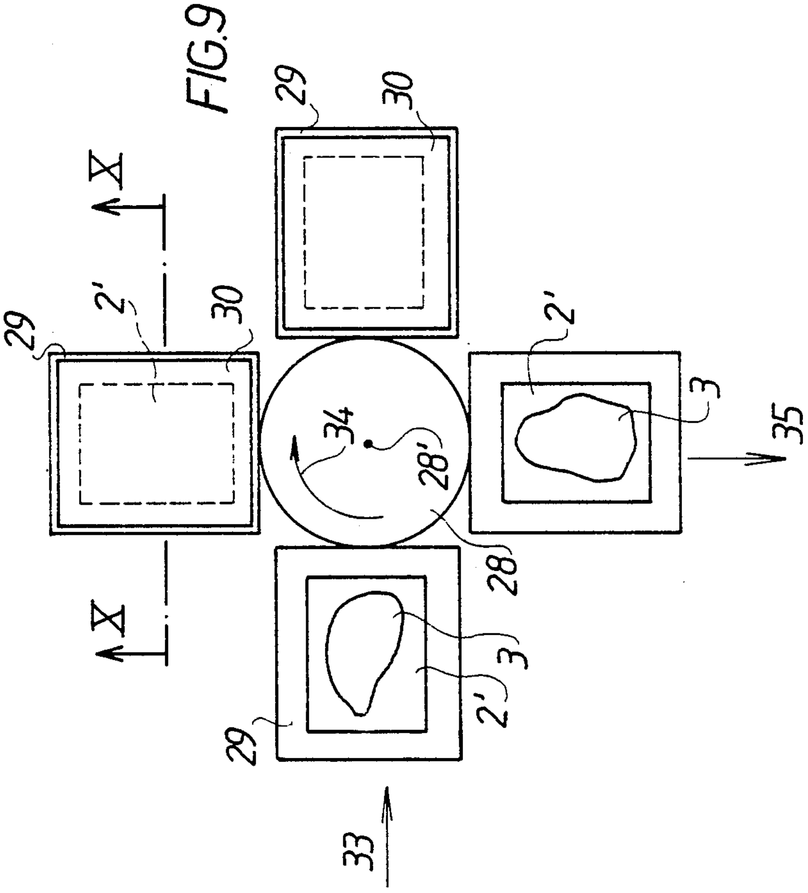
FIG. 9 shows in a top plan view a first embodiment of a vacuum device forming part of the apparatus according to the invention.

The FIGS. 9 and 10 show a first embodiment of a vacuum device. Tables 29 forming a carrier body for the supporting base 2' are fixed on a rotatable carrier member 28 which is rotatable around an axis 28'. At the location 33, a table 29 is charged with a supporting base 2' carrying a dressed split leather. Subsequently the tables 29 are moved in direction of the arrow 34. At the following location, there is placed onto the table 29 a diaphragm 30, which can be rectangular, in particular of square shape, but can also be of round, in particular circular, shape and which has at its edge a packing strip 31 extending around the circumference and having its free end, which is preferable provided with a profile, resting on the table 29. The diaphragm 30 provided with the packing strips 31 thus encloses the supporting base 2' together with the split leather 3.

An opening 32 arranged at a location of the packing strips and provided with a valve can be connected with a vacuum source (not shown), so that, after having connected this vacuum source, a reduced pressure is generated within the space enclosed by the diaphragm 30 and the packing strip 31 and provokes that the diaphragm 30 engages the split leather 3 and presses this split leather against the supporting base 2'; simultaneously the vapors generated on drying the dressing are sucked off.

The diaphragm 30 as well as the packing strip 31 consist of an elastomeric material, the packing strip 31 being preferably formed of a softer material than the diaphragm 30. The elastomeric material in question is preferably caoutchouc or rubber, in particular a silicone rubber.

If the valve of the opening 32 is being closed, the reduced pressure is maintained even when interrupting the connection with the vacuum source. Subsequently, the table 29 is, together with the supporting base 2' and the diaphragm 30 pressed against the split leather 3, brought into the position shown at the right hand of FIG. 9 and finally arrives at the discharge location 35 where the valve of the opening 32 is opened, so that the space enclosed by the diaphragm 30 and the packing strips 31 is connected with the atmosphere. On account of the restoring force intrinsic for the material of the diaphragm, the diaphragm 30 again returns in its starting position and can be lifted off, whereupon the dressed split leather is removed together with the supporting base 2'.

Figure 11:
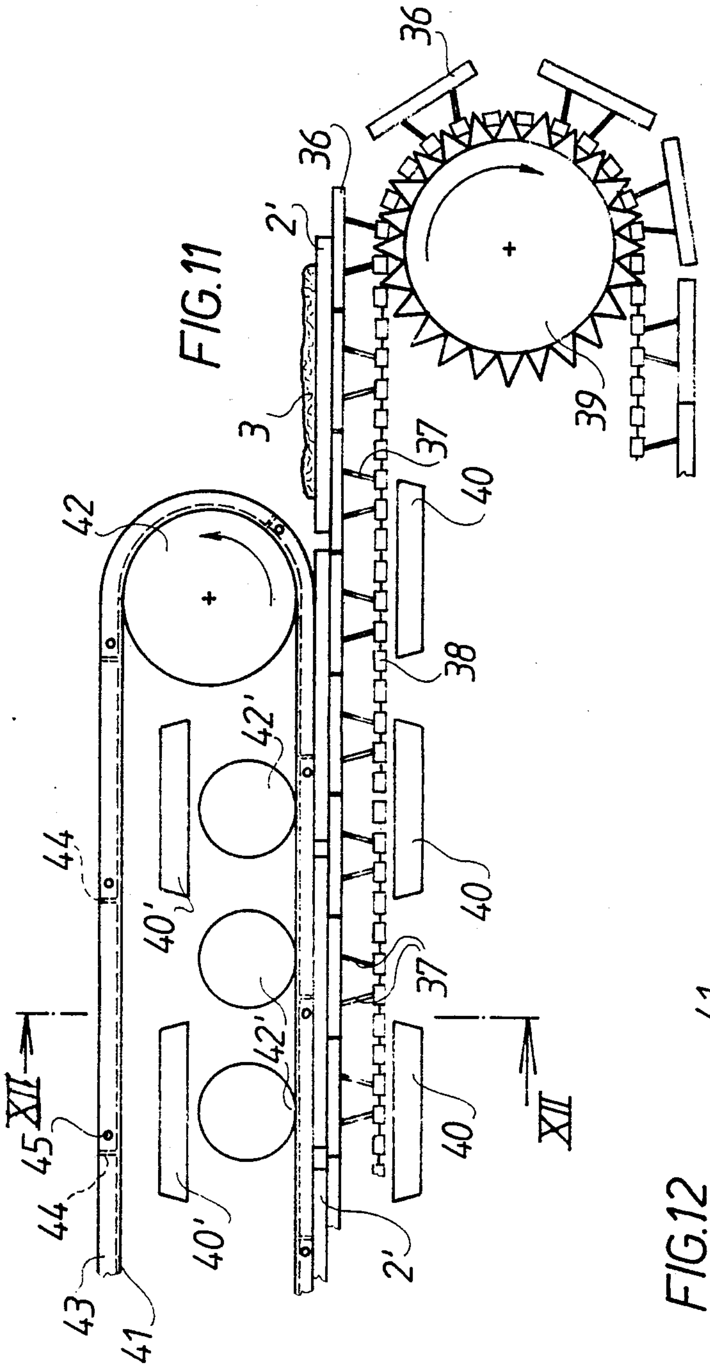
FIG. 11 shows a side elevation of a second embodiment of the vacuum device.
Figure 12:
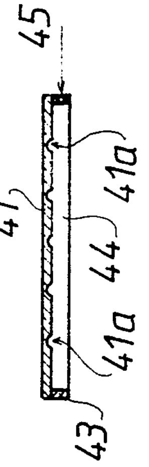
FIG. 12 shows a section along the line XII—XII in FIG. 11.

In the embodiment according to the FIGS. 11 and 12 there is provided a carrier body consisting of plate members being, via protruding extensions 37, in connection with conveyor chains 38 passed over sprocket wheels 39. In place of the plate members, also lamellae or tubular carrier bodies may be provided.

The supporting bases 2' carrying the split leather 3 provided with the dressing rest on the plate member 36. The supporting bases 2' are conveniently arranged such that they cover each one gap between two adjacent plate members 36.

Below the plate member 36, there are located heating means, for example infrared radiators 40, by means of which the plate member 36 and therewith also the bases members 2' are heated.

The plate member 36 cooperate with a diaphragm 41 consisting of an endless band being passed over rolls 42. This diaphragm 41 formed of the endless band is designed such that a tight closure between the diaphragm and the supporting bases 2' or the plate member 36 is possible, so that here again a sub-atmospheric pressure can be produced within the interstice. For this purpose, packing strips 43 of an elastomeric material are, in the embodiment shown in FIG. 11, provided at the marginal areas, extending in advancing direction, of the diaphragm 41, and optionally packing strips 44 transversely extending to the advancing direction are also provided. It has, however, been found that a vacuum can be generated also without providing such packing strips. Within the packing strips or within the diaphragm 41 (if packing strips are omitted) there are again provided openings 45 equipped with a valve and adapted to be connected with a vacuum source. This again results in pressing the diaphragm 41 against the split leather 3 located on the supporting base 2' as well as in sucking off the vapors generated on drying the dressing.

The endless band forming the diaphragm 41 is shorter in length than the carrier body formed of the plate member 36 and acting like an endless band, so that the finished dressed split leather 3 can in a simple manner be discharged together with the supporting base 2'.

Sucking off of the vapors is improved if grooves 41*a* are provided at the side of the diaphragm 41 facing the leather, via which grooves the vapors formed can escape. Of course, such grooves can also be provided in the diaphragm 30 of FIGS. 9 and 10.

The plate members 36 preferably consist of metal, for example steel. The arrangement of individual plate members in place of an endless steel band results in the advantage that any heat expansion of the plate members is, on account of the resulting sub-division, not disturbing. In particular when using supporting bases 2' of a silicone, the gap between adjacent plate members 36 is sealed by these supporting bases such that this gap does not prevent the generation of a vacuum. This vacuum is, in this case, generated between the supporting base 2' of silicone rubber and the diaphragm 41 and the packing strips 43, 44 (if present), noting that the diaphragm 41 is subdivided into a plurality of chambers by the packing strips 44.

The diaphragm 41 formed of an endless band conveniently consists of rubber caoutchouc and can be reinforced by a metal mesh, a fabric or a fleece. The reinforcement can either be arranged as an insert within the diaphragm or be placed onto the outer side of the diaphragm.

As a rule, the weight of the diaphragm 41 proper is sufficient to establish an initial seal relative to the supporting base 2', said seal being the premise for the following generation of the vacuum. However, also press rolls 42' can be provided for pressing the diaphragm 41 against the supporting base 2'. Furthermore, also the diaphragm 41 is conveniently heated by heating means 40', for example infrared radiators, which results in the advantage that any residues of the still liquid solution or still aqueous dispersion of the synthetic plastics material adhering to the diaphragm become there soldified and can subsequently easily be removed from the diaphragm.

The packing strips 43, 44 conveniently consist of a softer material than the diaphragm 41 and are glued or vulcanized to the diaphragm 41.

If the plate members 36 are not of metal but consist of a heat resistent synthetic plastics material, it is possible to arrange the packing strip on these plate members instead on the diaphragm.

The diaphragm 41 can also be arranged on an endless steel band.

Figure 13:
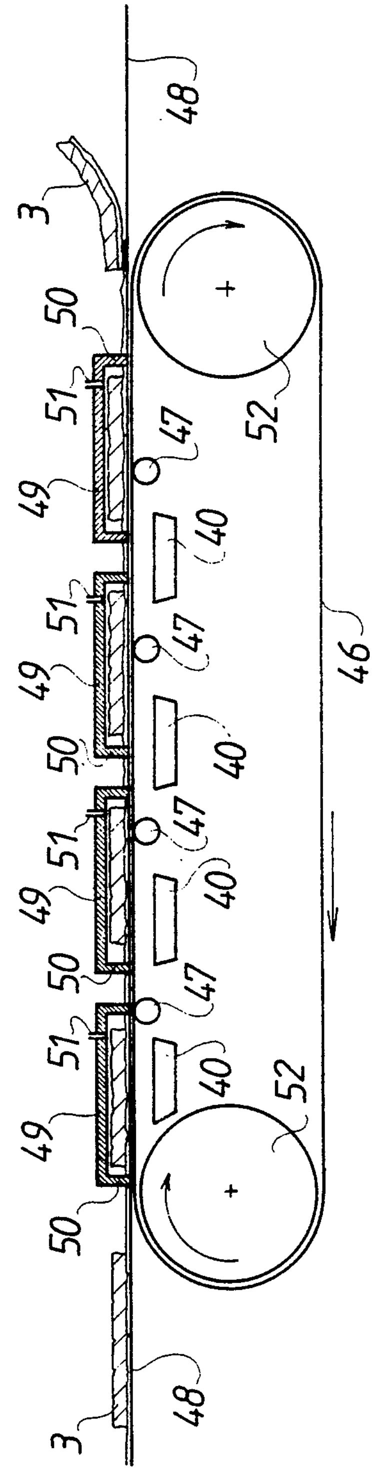
FIG. 13 shows a side elevation of a third embodiment of the vacuum device.

In the embodiment according to FIG. 13, the carrier body consists of an endless band 46 of steel or of an elastomeric, heat-resistent material, said band being supported by supporting rolls 47. Furthermore, heating means 40 are also in this case provided.

The band 46 carries a paper sheet 48 having already applied on its structured top surface a coating formed of an aqueous dispersion or of a liquid solution of synthetic plastics material, said coating forming the outer layer of the dressing. This paper sheet 48 replaces the supporting base 2'. Onto this paper sheet 48, there is placed in the described manner the split leather 3, having thereon the still aqueous dispersion of the synthetic plastics material, such that the wet side contacts the paper sheet. A diaphragm 49 comprising packing strips 50 extending around the circumference is placed on each split leather 3 having been placed onto the paper sheet. Here again, each diaphragm 49 has an opening 51 equipped with a valve and being adapted to be connected to a vacuum source. By applying the vacuum, the diaphragm is again pressed against the split leather and the vapors are sucked off. The split leather is, together with the diaphragm, further advanced by the band 46. At the end of this band, the diaphragm is lifted and the dressed split leather is peeled from the paper sheet 48. The layer having been prefabricated on the paper sheet 48 then forms the outer layer, containing the pigment, of the dressing. The paper sheet can again be provided with such a layer and can then again be used.

The band 46 is passed over rolls 52.

Also in this case, grooves 41*a* are conveniently again provided at the side of the diaphragm 49 facing the split leather 3 for facilitating removal of the vapors.

The operating steps of all described vacuum devices can be controlled to be in conformity with the speed of the preceding devices, so that a continuous production is possible.

In all apparatuses, the diaphragms may consist of various products of elastomeric properties such as natural rubber, synthetic rubber, silicone rubber and elastic polyurethane.

Figure 5:
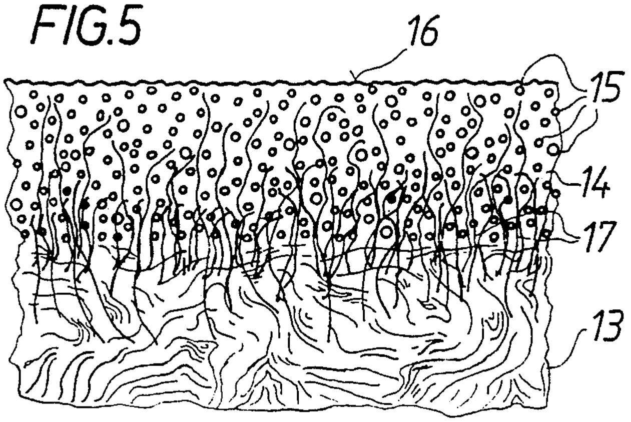
FIG. 5 shows in an enlarged scale a dressed split leather provided with a dressing consisting of a single layer.
Figure 6:
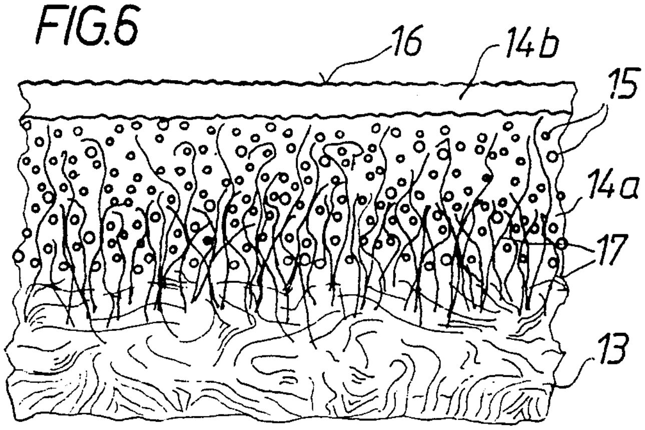
FIG. 6 shows in an enlarged scale an inventive split leather comprising a dressing formed of two layers.

The FIGS. 5 and 6 show a dressed split leather in an enlarged scale. In the embodiment according to FIG. 5, the split leather 13 is provided on its one side with a mono-layer dressing 14 having been formed of an aqueous dispersion of synthetic plastics material and having embedded therein hollow microspheres. As can be seen, the fibers completely extend into the dressing 14 at the top surface of the split leather 13 facing the dressing 14, which results in an intimate bond between the split leather 13 and the dressing 14. The visible side 16 of the dressing 14 is given a structured surface and thus has, for example, an appearance similar to that of leather.

In the embodiment according to FIG. 6, the dressing consists of two layers 14*a*, 14*b*, the inner layer completely receiving the fibers of the split leather 13 having embedded therein hollow microspheres 14*a*. This inner layer 14*a* has preferably a neutral color and contains neither pigments nor dye stuffs.

The outer layer 14*b* has a substantially smaller thickness than the inner layer 14*a* and comprises no hollow microspheres but instead therefor such an amount of pigments or, respectively, dye stuffs, that the tinge of the dressing is defined. The top surface 16 of this outer layer 14*b* is again given a structured surface and thus has an appearance similar to that of leather.

If the inner layer 14a located adjacent the leather has a neutral tinge relative to the leather and relative to the outer layer 14b and if pigments and/or dye stuffs are incorporated only in the outer layer 14b for defining the color of the dressing, there results the advantage that, in case a change in color of the dressing shall be effected, only the aqueous dispersion or liquid solution of synthetic plastics material forming the outer layer 14b must be replaced by an other one or, respectively, the application means therefor must be interchanged. In this case it is not necessary to adapt the color of the dispersion of synthetic plastics material forming the inner layer 14a and having a milky appearance. The neutral color of the inner layer 14a makes further sure that any inking of the leather to be provided with the dressing becomes not visible on the top surface of the dressing even if strongly inked leather is used.

It is of particular advantage if the inner layer 14a has a pore structure or foam structure, respectively. Such a layer has then the desired permeability for steam or water vapor. This further favourizes design of this inner layer in a neutral manner with respect to color. The pore structure or foam structure, respectively, can in particular be achieved if hollow microspheres having a diameter of 0.008 to 0.10 mm and having a thin shell of thermoplastic material, preferably of a vinylidenchloride copolymer, are embedded at least into the inner layer. Such hollow microspheres are known per se. Optimum results are obtained if the inner layer comprises more than 8 percent by volume of hollow microspheres.

For optimum results, also the density of the layers is of importance. Conveniently, the inner layer has a density between 0.6 and 0.8 and the outer layer has a density between 0.82 and 1.24.

Furthermore, a reinforcing insert formed, for example, of a textile material or of a fleece material having a weight per unit area of less than 80 g/m$^2$ can be arranged within at least one layer. The permeability of the dressing for water vapor can be increased in the desired manner by this reinforcing insert. Furthermore, such an insert acts like an armoring and prevents excessive elongation and thus destruction of the dressing on tension stress.

If the structured surface of the outer layer shall be given a special appearance, an additional thin finish layer, for example a layer influencing the lustre or the color, can be arranged on this surface. This additional layer does, however, not form a necessary component of the dressing which is, as already mentioned, conveniently formed of two layers. The thickness of this additional layer having been applied only at a later stage is thus not to be considered in the thickness of the dressing.

The structured surface of the dressing can, as is desired, have the appearance similar to that of leather grain or have the appearance of a finely ground leather of fully-grained type, the latter resulting in a pile effect.

The split leather has, in combination with the dressing, conveniently a permeability for water vapor of more than 0.3 mg/cm$^2$. The permeability for water vapor is measured according to JUP 15, an European Test Specification for determining the permeability of leather for water vapor.

For forming the dressing, an aqueous dispersion of synthetic plastics material is applied, in the wet stage, in an amount between 150 g/m$^2$ and 450 g/m$^2$ and preferably in an amount of approximately 300 g/m$^2$, whereupon the leather is, with its side provided with the dressing facing downward, placed onto a supporting base having a structured surface and finally the leather with the dispersion of synthetic resin material applied thereon is compressed and subjected to a vacuum treatment. When applying the dispersion of synthetic plastics material in the indicated amount, there is produced a dressing of such a thickness that, on the one hand, a good and inseparable bond with the leather is obtained and fibers protruding from the leather are completely embedded in a reliable manner and that, on the other hand, the properties of the leather are not adversely influenced by the dressing. On account of the leather being placed on the supporting base having the structured surface with its side carrying the dressing facing downwardly, the structure in the dressing is produced immediately on solidification of the dressing, so that no separate operating step is required therefor, noting that a bubble-free solidification of the dressing with simultaneous formation of the structured surface is assisted by the pressing step and by the vacuum treatment.

For imparting to the layer located adjacent the leather and completely receiving the fibers protruding from the leather the desired foam structure, there are conveniently incorporated into the aqueous dispersion of synthetic resin material and prior to applying same hollow microspheres having a diameter of 0.008 to 0.1 mm, the thin shell of these microspheres consisting of thermoplastic material, preferably of a vinylidenechloride copolymer.

If the dressing is formed of two layers, a further aqueous dispersion of synthetic resin material or a further liquid solution of synthetic plastics material is applied onto the structured surface of the supporting base prior to placing the leather having applied thereon an aqueous dispersion of synthetic plastics material onto said supporting base, noting that the leather is placed onto the supporting base only after solidification of said further aqueous dispersion or, respectively, liquid solution of synthetic plastics material. This further aqueous dispersion or, respectively, liquid solution of synthetic plastics material may then, for example directly form a finish.

The inner layer has a greater thickness than the outer layer and the thickness of the inner layer is greater than 0.11 mm and preferably greater than 0.21 mm. The thickness of the outer layer should be smaller than 0.16 mm and preferably smaller than 0.10 mm. The outer layer can contain very fine cellulose particles or polyvinylmethylether.

EXAMPLE 1

A split leather dressed according to the invention and being comparable with respect to its appearance and its properties with a full-grained natural leather of the same type and thickness is produced in the following manner:

A support base of silicone being reinforced by an asbestos fabric insert and being composed of two layers is placed onto a moving belt and heated on this moving belt during further advancement to approximately 85° C. by means of infrared radiation. The supporting base consisting of silicone has a size of 2.4 m$^2$ and a thickness of about 3 mm. An aqueous dispersion containing about 45 percent solid matter is applied by pouring onto the supporting base of silicone having a temperature of about 85° C. The dispersion contains about 40 percent polyurethane and about 5 percent white pigment and has a viscosity of approximately 60 seconds (the viscosity is determined in the Ford-beaker using a 4 mm nozzle). The wet dispersion is applied onto the warm supporting base in a thickness of approximately 0.11 mm, thickening and subsequent solidification of this dispersion taking place immediately after arrival on the supporting base by evaporation of water. The supporting base has a structured top surface, so that on solidification of this layer comprising the pigment, there is simultaneously formed the later visible grain structure of the dressing. The solidified outer layer has a thickness of approximately 0.06 mm. The polyurethane dispersion forms a film having a hardness of approximately 90 Shore A.

During solidification, the supporting base is moved on the conveyor belt with a speed of 4.5 m/min. 8 meters behind the pouring station for the dispersion containing the pigment, there is placed on the pre-dried and pigment-containing layer on the supporting base - without manual assistance - a split leather, onto which previously has been applied an aqueous dispersion of synthetic resin material, with its wet side. The split leather has a size of approximately 1.3 $m^2$ and a thickness of 1.4 mm and has a light chrome green color.

The dispersion applied to the split leather is a polyurethane dispersion containing approximately 62 percent solid matter. This solid matter is substantially composed of 50 percent polyurethane and 10 percent hollow microspheres as well as a thickening agent. The aqueous dispersion has a viscosity of approximately 280 seconds (as measured in a Ford-beaker using a 4 mm nozzle) and forms on drying a film having a hardness of approximately 65 Shore A and a density of approximately 0.78. Application of the relatively viscous dispersion onto the split leather has been effected by means of a roll rotating in opposite direction to the direction of movement of the leather, so that the dispersion is, by making use of the shearing forces, massaged into the leather and substantially fills all interstices between the protruding fibers. On account of the fibers protruding from the leather having differing length, the thickness of the layer can not be determined. The applied weight of the wet dispersion was approximately 240 $g/m^2$.

After having placed the leather onto the solidified pigment layer on the supporting base, this leather is pressed onto the supporting base by means of a soft, elastic roll coated with a silicone, so that air inclusions, if any, between the pigment layer and the wet dispersion of synthetic resin material applied onto the leather can escape. Subsequently, the leather provided with the dressing and resting on the supporting base is, together with the supporting base, introduced into a warm vacuum device being equipped with a diaphragm, noting that within the diaphragm a reduced pressure is produced, so that the diaphragm is moved in downward direction and is pressed against the leather. The diaphragm becomes thereby adapted to the contours and presses the leather onto the supporting base. The gases and the steam generated when heating the vacuum device are sucked off via the vacuum conduit. After approximately 75 seconds, the finished dressed leather can be removed from the vacuum device. During this time, the vacuum device has been further advanced, so that the production is a continuous one.

EXAMPLE 2

A split leather provided with a grained dressing of particular high abrasion resistance is produced as follows:

A polyurethane solution of high viscosity is applied by means of a wiper or doctor blade, respectively, in a thickness of 0.13 mm onto a carrier consisting of paper and having a negative grain structure and a surface finish allowing release of a solidified polyurethane film. The polyurethane solution contains as solid matter substantially 38 percent of polyurethane and 3 percent of a brown pigment. This solution forms on drying a film having a density of approximately 1.05 and a hardness of approximately 98 Shore A. This pigment layer is prefabricated on the carrier consisting of paper, so that this carrier can, together with a pigmented layer, be stored until being used.

When producing the dressing of a split leather, the carrier of paper is placed on a supporting base, for example a conveyor belt, and moved in direction to the transfer location for the leather having been provided with the wet dispersion of synthetic resin material, where the leather is - without manual assistance - placed with its wet side onto the pigment layer of the carrier consisting of paper. The aqueous dispersion of synthetic plastics material applied to the leather is free of pigments and has a milky appearance.

Subsequently, the paper sheet runs, with the leather placed thereon, below and past the application device for applying the aqueous dispersion of synthetic plastics material onto the leather to a pair of rollers where pressing is effected.

The layer of aqueous dispersion applied to the leather corresponds with respect to its composition and amount to that in Example 1.

Subsequently, the supporting base of paper is, together with the split leather placed thereon, received by a heated endless steel band having a length of more than 12 m and a width of more than 1.2 m and further advanced by the steel band such that at those areas where the leather is placed on the paper sheet; a rubber cover comprising a sealing frame and an opening, being equipped with a valve, for connecting thereto a vacuum force and acting as a diaphragm, is placed onto the leather in a position to cover the leather. Subsequently, the air present within the rubber cover is sucked off, so that the diaphragm engages the leather and presses the leather onto the paper sheet or, respectively, the steel band under the action of the generated reduced pressure. Under the influence of the pressure exerted by the diaphragm on the leather, there results a good bond between the pigment layer applied to the paper sheet and the dispersion layer comprising the hollow microspheres and embedding the fibers of the leather while the dispersion layer becomes solidified. Under the action of the reduced pressure and under the action of heat, the dispersion layer is rapidly dried.

Heating of the stell band to a temperature between 70° and 140° C. is effected by exposing the lower side of the steel band to the radiation of infrared radiators.

Approximately 60 seconds after applying the vacuum, the valve is opened and the rubber cover assumes, on account of its elastic properties, its original shape. After having removed the rubber cover, the finished leather can be peeled from the paper sheet. By longitudinal grooves and transverse grooves provided in the rubber cover it is made sure that gases and water vapor can escape from the leather even if the diaphragm is pressed against the leather under the action of the vacuum.

What I claim is:

1. A dressed leather provided at least on one side with depressions and having on said one side absorbent protruding fibers and being bonded at this side with a layer formed from an aqueous dispersion of synthetic plastics material, said layer filling the depressions and completely receiving the protruding fibers and forming at least part of a dressing, said dressing being provided with a structured surface at the side turned away from the leather, the dressing consisting of an inner layer which is adjacent the leather and completely receives the protruding fibers, and which is formed from the aqueous dispersion of synthetic plastics material, and an outer layer which has the structured surface and is formed from an aqueous dispersion of synthetic plastics material, the inner layer having a greater thickness and lesser density than the outer layer, the thickness of the inner layer being greater than 0.11 mm, the thickness of the outer layer being smaller than 0.10 mm, and at least the inner layer having a pore structure or foam structure, respectively, and a reinforcement in at least one of the layers.

2. A leather as claimed in claim 1, wherein the inner layer located adjacent the leather is made neutral with respect to color relative to the leather and relative to the outer layer comprising the structured surface and wherein pigments or, respectively, dye stuffs are incorporated into the outer layer and define the color shade of the dressing.

3. A leather as claimed in claim 1 wherein the thickness of the inner layer is greater than 0.21 mm.

4. A leather as claimed in claim 3 wherein at least in the inner layer there are embedded hollow microspheres having a diameter between 0.008 and 0.10 mm, the microspheres having thin shells consisting of a vinylidenechloride copolymer, the inner layer containing more than 8 percent by volume of hollow microspheres.

5. A leather as claimed in claim 3 wherein the inner layer has a density between 0.6 and 0.8 and the outer layer has a density between 0.82 and 1.24.

6. A leather as claimed in claim 1 wherein the reinforcement consists of a textile material or fleece having a weight per unit area of less than 80 g/m$^2$.

7. A leather as claimed in claim 3 wherein the structured surface of the outer layer is provided with an additional thin finish layer.

8. A leather as claimed in claim 3 wherein the structured surface of the outer layer has the appearance of a finely ground, full-grain leather.

9. A leather as claimed in claim 3 wherein at least the outer layer contains finest cellulose particles.

10. A leather as claimed in claim 3 wherein at least the outer layer contains heat-sensible substances.

11. A leather as claimed in claim 10 wherein at least the outer layer contains polyvinylmethylether.

12. A leather as claimed in claim 3 which has, together with the dressing, a permeability for water vapor of more than 0.3 mg/cm$^2$.

* * * * *